US012525726B2

(12) United States Patent
Ramabadran et al.

(10) Patent No.: US 12,525,726 B2
(45) Date of Patent: Jan. 13, 2026

(54) WIDEBAND DUAL-POLARIZED ANTENNA ELEMENT AND INTERLEAVED ANTENNA ARRAY

(71) Applicant: QUALCOMM Incorporated, San Diego, CA (US)

(72) Inventors: Prasidh Ramabadran, Bangalore (IN); Sunil Kumar, Bangalore (IN); Madhav Venkateswaran, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 18/490,283

(22) Filed: Oct. 19, 2023

(65) Prior Publication Data

US 2025/0132505 A1 Apr. 24, 2025

(51) Int. Cl.
*H01Q 21/06* (2006.01)
*H01Q 9/04* (2006.01)

(52) U.S. Cl.
CPC ......... *H01Q 21/065* (2013.01); *H01Q 9/0407* (2013.01)

(58) Field of Classification Search
CPC ........................... H01Q 21/065; H01Q 9/0407
See application file for complete search history.

(56) References Cited

U.S. PATENT DOCUMENTS

| | | | | |
|---|---|---|---|---|
| 11,056,771 | B2 | 7/2021 | Jia | |
| 2020/0076083 | A1 | 3/2020 | Fukunaga et al. | |
| 2021/0098894 | A1 | 4/2021 | Haviv et al. | |
| 2023/0072139 | A1* | 3/2023 | Moallem .............. | H01Q 9/0414 |
| 2023/0378652 | A1 | 11/2023 | Jiang et al. | |

FOREIGN PATENT DOCUMENTS

| | | | |
|---|---|---|---|
| CN | 114649692 | A | 6/2022 |

OTHER PUBLICATIONS

International Search Report and Written Opinion—PCT/US2024/050374—ISA/EPO—Mar. 28, 2025.

Partial International Search Report—PCT/US2024/050374—ISA/EPO—Feb. 7, 2025.

Rosa J., et al., "Dual-band Microstrip Patch Antenna Element with Double U Slots for GSM", Antennas and Propagation Society International Symposium, IEEE, Jul. 16-21, 2000, Piscataway, NJ, USA, pp. 1596-1599, XP032401042, DOI: 10.1109/APS.2000.874538, ISBN: 978-0-7803-6369-4, Sections 1-3, figures 1,3.

* cited by examiner

*Primary Examiner* — Henry Luong

(74) *Attorney, Agent, or Firm* — Polsinelli/Qualcomm Incorporated

(57) ABSTRACT

A multi-band antenna element is provided with a stacked pair of a first low-band patch antenna element and a second low-band patch antenna element and also a high-band patch antenna element for operation across both a low band and a high band. An L-shaped probe in the multi-band antenna is configured to parasitically excite the high-band patch antenna element. A linear slot in the second low-band patch antenna element is configured to resonant in the high band.

27 Claims, 9 Drawing Sheets

WIDEBAND DUAL-POLARIZED ANTENNA ELEMENT AND INTERLEAVED ANTENNA ARRAY

FIELD OF TECHNOLOGY

The present disclosure relates generally to antennas and more specifically to a wideband dual-polarized antenna element and interleaved antenna array.

BACKGROUND

The use of patch antennas is a convenient and relatively low-cost approach for millimeter wave applications. In a patch antenna, the electric field strength is greatest at the edge of the patch and zero at the center of the patch. The electric field lines between a ground plane and a radiating patch antenna will thus curve or bulge beyond the edges of the patch antenna to create what is denoted as a fringing field. As a result of the fringing field, the effective size of a patch antenna is larger than just the actual patch dimensions. Although patch antennas are a convenient and relatively low-cost antenna architecture, the fringing field radiation from patch antennas may result in relatively narrow bandwidths.

The narrow bandwidth of patch antennas may be problematic for their use in wireless systems employed in millimeter wavelength (mmW) spectrums (e.g., 24 GHz to 48 GHz for 5G NR high bands, also referred to as FR2, although higher frequencies may be used). To cover the entire FR2 band using patch antennas may then require the use of multiple antenna arrays in which each antenna array is dedicated to a particular subset of the FR bandwidth but this increases manufacturing costs and may require excessive space in a mobile device. Alternatively, interleaved patch antennas may be used on different substrate stacks, which again increases manufacturing costs.

SUMMARY

The following summary discusses some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, a multi-band antenna element is provided that includes: a ground plane; a first patch antenna element adjacent the ground plane; a first L-shaped probe including a first via and a first feed, wherein the first via extends from the ground plane to the first feed, the first patch antenna element is positioned between the first feed and the ground plane, and a plane defined by the first feed is orthogonal to the first via; a second patch antenna element, wherein the first feed is positioned between the second patch antenna element and the first patch antenna element, and wherein the first L-shaped probe is configured to parasitically excite the second patch antenna element; and a third patch antenna element including a first linear slot, wherein the second patch antenna element is positioned between the third patch antenna element and the first feed, the first patch antenna element is configured to parasitically excite the third patch antenna element, and the second patch antenna element is configured to parasitically excite the first linear slot.

In accordance with another aspect of the disclosure, a multi-band antenna method of operation is provided that includes: exciting a first low-band patch antenna to resonate at a first frequency within a low band; parasitically exciting a second low-band patch antenna to resonate at a second frequency within the low band responsive to the exciting of the first low-band patch antenna; exciting an L-shaped probe with a high-band signal; parasitically exciting a high-band patch antenna to resonate at a third frequency within a high band responsive to the exciting of the L-shaped probe, wherein a lowest frequency of the high band is greater than a highest frequency of the low band; and parasitically exciting a slot in the second low-band patch antenna to resonate at a fourth frequency within the high band responsive to the exciting of the L-shaped probe.

In accordance with yet another aspect of the disclosure, a linear antenna array is provided that includes: a plurality of multi-band antenna elements, wherein each multi-band antenna element is configured to transmit and receive across a low band and across a high band, wherein a lowest frequency of the high band is greater than a highest frequency of the low band; and a plurality of high-band antenna elements, wherein each high-band antenna element is configured to transmit and receive across the high band, the high-band antenna elements and the multi-band antenna elements alternate in order with respect to each other across the linear antenna array, and a spacing between each high-band antenna element to a neighboring one of the multi-band antenna elements is sized according to a maximum scan angle that is less than or equal to 90 degrees, and wherein the scan angle is defined with respect to a normal to a plane of the linear antenna array.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
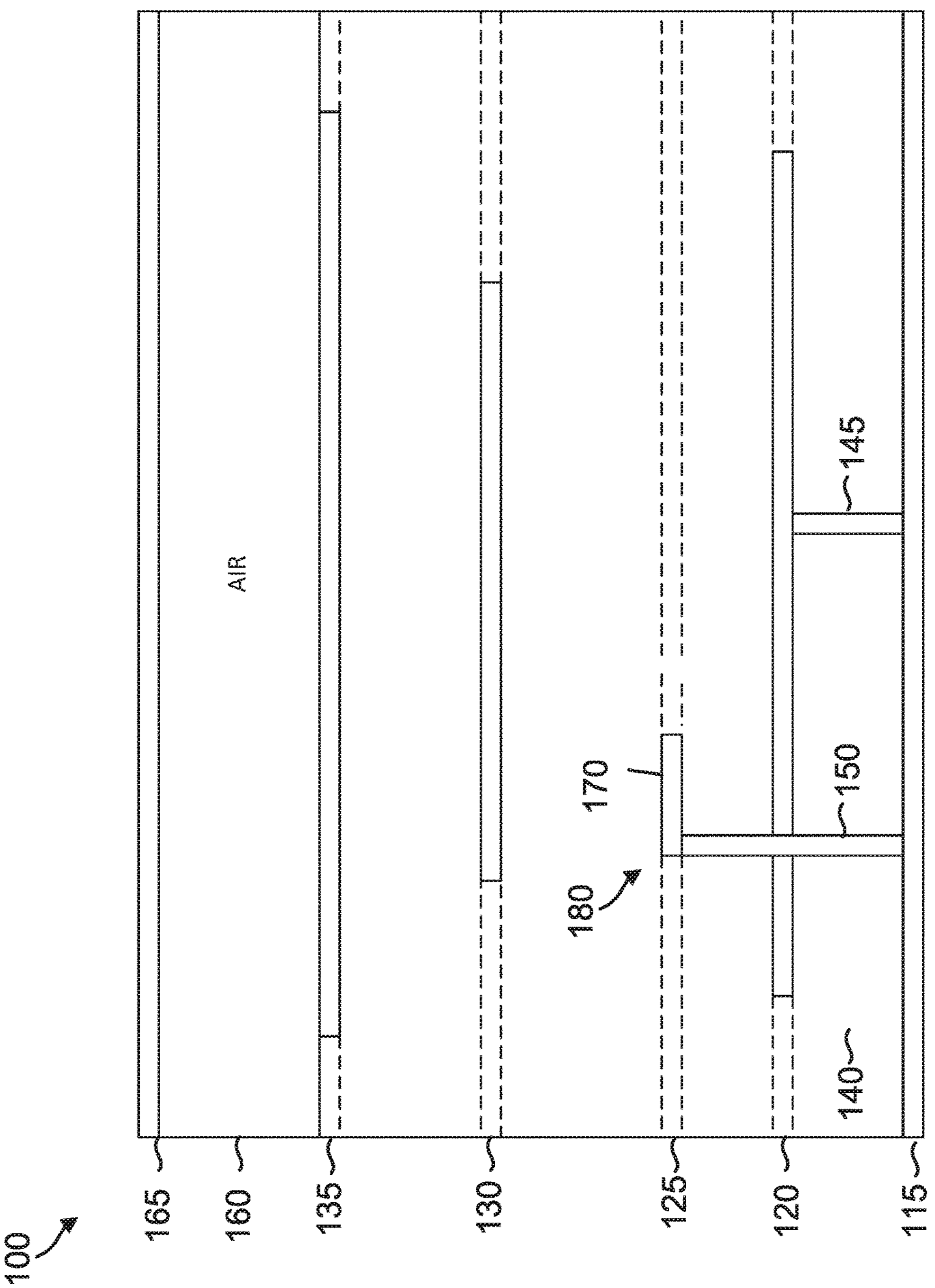
FIG. 1 is a cross-sectional view of an example multi-band antenna element in accordance with an aspect of the disclosure.

To form a patch antenna, one or more metal layers may be patterned. The metal layers are stacked with respect to intervening dielectric layers. The patterning of each metal layer to form a patch antenna is analogous to the patterning of metal layers to form leads or other types of conductors in integrated circuit applications. Patch antennas are thus a relatively low-cost and convenient antenna architecture for mobile devices. But as noted previously, the fringing field radiation from a patch antenna typically results in a relatively narrowband performance. Such narrowband performance may be problematic with respect to designing a multi-band antenna element that can provide adequate performance across a relatively wide frequency band such as the FR2 band (approximately 24 GHz to 48 GHz).

Despite the potentially narrowband behavior of patch antennas, a patch-based multi-band antenna element is disclosed herein that advantageously provides wideband coverage across both a low band and a high band. The resulting multi-band antenna element may be advantageously incorporated into a wide variety of communication devices such as a user equipment (UE), a base station, an automobile, customer premises equipment (CPE), and so on. As implied by their names, a center frequency of the low band is lower in frequency as compared to a center frequency of the high band. More specifically, a lowest frequency of the high band is greater than a highest frequency of the low band. The following discussion will be directed to a multi-band antenna element designed to provide wideband coverage across a low band of the Frequency Range 2 (FR2) band (e.g., from 24.25 GHz to 29.5 GHZ) and across a high band of FR2 band (e.g., from 37 GHz to 48 GHz) but it will be appreciated that the multi-band antenna elements disclosed herein may be readily adapted for additional frequency bands that are either higher in frequency or lower in frequency as compared to the FR2 band. With respect to the 24.25 GHz to 29.5 GHz low band and the 37 GHz to 48 GHz high band, note that the lowest frequency of the high band is approximately 1.25 times greater than the highest frequency of the low band. Such a relatively small separation between the low band and high band presents a challenge to constructing a wideband multi-band antenna element for an antenna array that can adequately cover both the low band and the high band. The wideband multi-band antenna element disclosed herein advantageously accommodates both the high band and the low band despite such a relatively small separation.

Not only does the multi-band antenna element provide wideband coverage but it also provides enhanced cross-polarization isolation. The multi-band antenna element may thus receive or transmit according to a first linear polarization without a significant coupling to a second linear polarization that is orthogonal to the first linear polarization. Conversely, the multi-band antenna element may receive or transmit according to the second linear polarization without a significant coupling to the first linear polarization. In addition to the multi-band antenna element itself, an interleaved antenna array is disclosed herein that includes a plurality of multi-band antenna elements interleaved or alternating with high-band antenna elements. The multi-band antenna element will now be discussed in more detail, followed by a discussion of the interleaved antenna array.

The multi-band patch antennas disclosed herein may include a stack of a first patch antenna element, a second patch antenna element, and a third patch antenna element. Each patch antenna element may be formed by the patterning of a corresponding metal layer. The first and third patch antenna elements are sized so as to be resonant at respective first and second frequencies within the low band. The second patch antenna element is sized so as to be resonant at a first frequency within the high band. The high band extends from a lowest high-band frequency to a highest high-band frequency. Similarly, the low band extends from a lowest low-band frequency to a highest high band frequency that is lower in frequency than the lowest high-band frequency.

Since the metal layers are stacked akin to a layers of a cake, the patch antennas elements have the same stacking. For example, the metal layers may range from a first metal layer to a fourth metal layer (not counting a metal layer for an underlying ground plane). The first metal layer is adjacent a bottom-most dielectric layer that separates the first metal layer from the ground plane layer although what is low and high is of course a matter of perspective. With regard to this stacking, the first patch antenna element may be formed in the first (nearest to bottom) metal layer whereas the third patch antenna element may formed in the fourth (nearest to highest) metal layer. Since both the first and third patch antennas elements are sized to be resonant at respective first and second frequencies within the low band, the first patch antenna element may also be denoted herein as a first low-band patch antenna element whereas the third patch antenna element may also be denoted as a second low-band patch antenna element.

The resulting stacking of the first and second low-band patch antennas along with their respective sizing provides a wideband coverage across the low band that extends from the lowest frequency in the low band to the highest frequency in the low band. In one implementation, the first low-band patch antenna element may be excited through a first pair of vias that directly couple to the first low-band patch antenna element. Each via in the first pair of vias may be deemed to form a corresponding port to the first and second low-band patch antenna elements. The first pair of vias are positioned so that one of the vias excites the first low-band patch antenna element according to a first linear polarization whereas a second one of the vias excites the first low-band patch antenna element according to a second linear polarization that may be orthogonal to the first linear polarization. The second low-band patch antenna element is parasitically excited by the first low-band patch antenna element such that no vias are necessary to drive the second low-band patch antenna element. Recall that the second low-band patch antenna element is formed in the fourth metal layer that is relatively remote from the ground metal layer (the bottom-most metal layer). The parasitic excitation of the second low-band patch antenna element is thus advantageous with respect to avoiding the use of relatively-long vias that would couple to the second low-band patch antenna element. Such relatively-long vias may undesirably act as secondary dipole antennas and also lower bandwidth due to their parasitic inductance.

Although the wideband multi-band antenna element is described herein with respect to four metal layers (not counting a separate ground plane), it will be appreciated that additional metal layers may be used. However, it is advantageous to use only four metal layers to lower construction costs and complexity. Given the desirable restriction to four metal layers, an analogous pair of stacked patch antennas to cover the high band is not used in many examples. For example, suppose that a second metal layer in the stack of metal layers is used to form a first high-band patch antenna element. Such a high-band patch antenna element may be too shielded by the other structures in the metal layer stack and thus have too low of an antenna gain. The second metal layer is thus used to form a planar feed of an L-shaped probe. The L shape of the L-shaped probe is completed by a corresponding via that extends from the ground plane to the planar feed. Since the planar feed is formed from the second metal layer, it defines a plane that projects orthogonally from the corresponding via to form the L shape. In alternative implementations, an analogous pair of L-shaped probes may be used to excite the first low-band patch antenna element in lieu of the use of the first pair of vias.

The second metal layer may be patterned to form two feed portions for two corresponding L-shaped probe. Each L-shaped probe is positioned appropriately for the exciting of a corresponding linear polarization in a high-band patch antenna element formed in a third metal layer in the stack of metal layers. Since the metal layers are stacked in order, the second metal layer is higher than the first metal layer. Similarly, the third metal layer is higher than the second metal layer. Finally, the fourth metal layer is higher than the third metal layer. The high-band patch antenna element is an example of the second patch antenna element discussed above. A first one of the L-shaped probes parasitically excites the high-band patch antenna element to be resonant according to the first linear polarization at a first frequency within the high band. Similarly, a second one of the L-shaped probes parasitically excites the high-band patch antenna element to be resonant according to the second polarization at the first frequency within the high band. The high-band patch antenna element is thus a dual-polarized high-band patch antenna element.

But note that the mere use of the dual-polarized high-band patch antenna element without more may result in a fairly narrowband performance within the high band. For example, if the high-band patch antenna element is sized so that the first frequency in the high band is relatively close to the lowest frequency of the high band, then operation solely with the high-band patch antenna element may not be satisfactory for the higher frequencies in the high band. A second high-band patch antenna element could be stacked with respect to the high-band patch antenna element but then more than four metal layers may be needed. Alternatively, the fourth metal layer could be patterned with parasitic elements positioned around the second low-band patch antenna element and sized so as to be resonant at a relatively high second frequency within the high band. But such additional elements then increase the size of the multi-band antenna element.

To solve this dilemma, the second low-band patch antenna element is patterned with at least one slot antenna configured to resonate at a second frequency within the high band. For example, the second low-band patch antenna element may include a pair of intersecting linear slots that are parasitically excited by the high-band antenna and may thus share its dual-polarized ports. In this fashion, an advantageously compact yet high performance dual-polarized multi-band antenna element is provided.

A cross-sectional view of an example wideband multi-band antenna element 100 is shown in FIG. 1. The wideband multi-band antenna element 100 is formed in the plurality of stacked metal layers beginning with a bottom-most metal layer. As used herein, the term "metal layer" will be understood to refer to any suitable planar conducting layer and may be formed from a deposited metal or a conductive film. In multi-band antenna element 100, a ground metal layer 115 (the bottom-most metal layer) functions as a ground plane for the multi-band antenna element 100. Underneath the ground metal layer 115 may be free space (air), or the assembly may be coupled to other components of a communication device. Multi-band antenna element 100 spans across a first metal layer 120, a second metal layer 125, a third metal layer 130, and a fourth metal layer 135. These metal layers are insulated from each other and supported through corresponding dielectric layers (which may also be denoted as substrates) such as a dielectric layer 140 between the ground metal layer 115 and the first metal layer 120.

Figure 2:
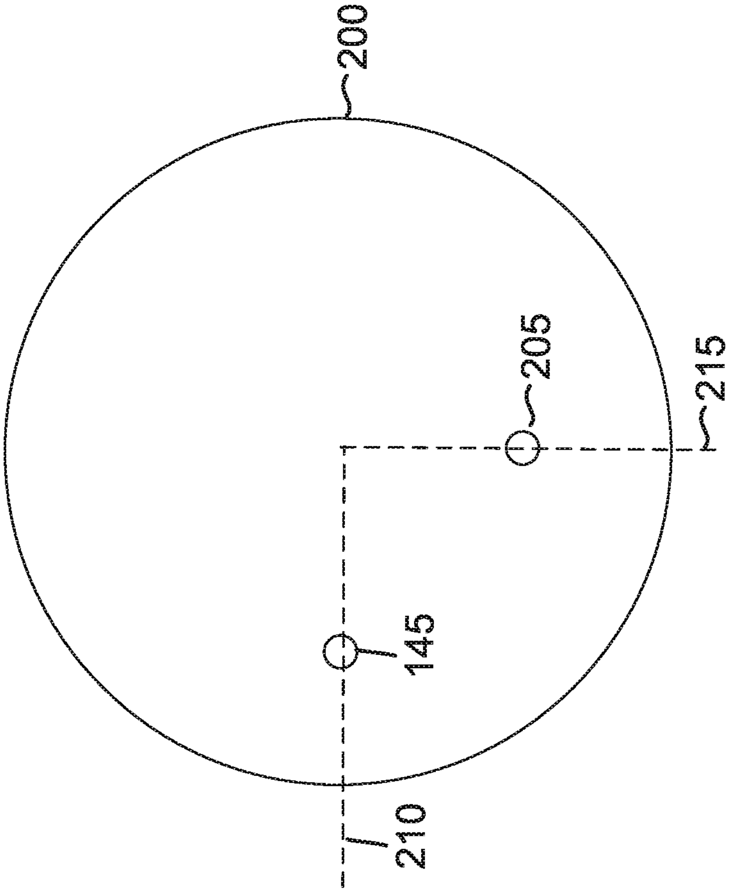
FIG. 2 is a plan view of a first low-band patch antenna element for a multi-band antenna element in accordance with an aspect of the disclosure.

The first metal layer 120 is patterned to form a first low-band patch antenna element 200 as shown in plan view in FIG. 2. The portions of the first metal layer 120 that are removed from the patterning are shown as dotted portions in FIG. 1. Similarly, the portions of the other metal layers in FIG. 1 that are analogously removed are also shown as dotted portions. In the wideband multi-band antenna element 100, the patch antenna elements such as the first low-band patch antenna element 200 are circular patch antennas but it will be appreciated that other patch shapes such as a rectangular patch, a square patch, or a plus-shaped patch may be used in alternative implementations. Note, however, that a circular patch such as the first low-band patch antenna element 200 is advantageously compact with respect to incorporating the wideband multi-band antenna element 100 in an antenna array as will be explained further herein.

Multi-band antenna element 100 is configured for coverage across the low band that is distinct from the high band. In the following discussion, the low band extends from the 24.25 GHz to 29.5 GHz whereas the high band extends from 37 GHz to 48 GHz. However, it will be appreciated that such low band and high band frequencies are merely illustrative and that the multi-band antenna element 100 may be readily adapted to provide coverage for alternative low bands and high bands. With respect to the low band, first low-band patch antenna element 200 has a diameter dimensioned so as to be resonant at approximately 27.5 GHz. As noted earlier, a single patch antenna element such as the first low-band patch antenna element 200 may be relatively narrowband. Thus, the multi-band antenna element 100 includes an additional low-band patch antenna element to cover the entirety of the low band as will be explained further herein.

To transmit and receive according to a first linear polarization, a first via 145 couples to the first low-band patch antenna element 200 as may also be seen in FIG. 1. A suitable transmission line (e.g., a microstrip line, not illustrated)) couples between via 145 and a transceiver (not illustrated) for transmitting and receiving according to the first linear polarization. Similarly, a second via 205 couples to the first low-band patch antenna element 200 for transmission and reception according to a second linear polarization that may be orthogonal to the first linear polarization. Another transmission line (not illustrated) couples between the second via 205 and the transceiver for transmitting and receiving according to the second linear polarization. Note that circular polarization (both left-hand or right-hand) or an elliptical polarization can also be generated through a suitable driving of the vias 145 and 205. Both vias 145 and 205 are symmetrically displaced with respect to a center and an edge of the low-band patch antenna element 200. If a line 210 is drawn from the patch center to the patch edge that passes through via 145 and an analogous line 215 is drawn from the center to the edge that passes through via 205, it may be seen that lines 210 and 215 are orthogonal to each other so that the corresponding linear polarizations may be excited. In one implementation, the first linear polarization may be a vertical polarization whereas the second linear polarization may be a horizontal polarization but it will be appreciated that other orthogonal polarizations such as +45 degrees and −45 degrees may be used in alternative implementations.

Figure 3:
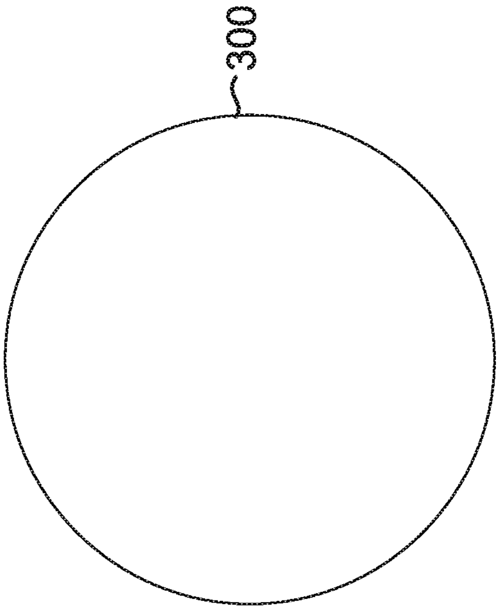
FIG. 3 is a plan view of a high-band patch antenna element for a multi-band antenna element in accordance with an aspect of the disclosure.

Analogous to how the first metal layer 120 is patterned to form the first low-band patch antenna element 200, the third metal layer 130 may be patterned to form a high-band patch antenna element 300 as shown in plan view in FIG. 3. Like the first low-band patch antenna element 200, the high-band patch antenna element 300 is a circular patch antenna element but it will be appreciated that other patch topologies such a square patch, a rectangular patch, or a plus-shaped patch may be used in alternative implementations. Referring again to FIG. 1, note that the third metal layer 130 for forming the high-band patch antenna element 300 is relatively displaced from the first metal layer 120 forming the first low-band patch antenna element 200. Should vias be used to drive the high-band patch antenna element 300 akin to the driving of the first low-band patch antenna element 200, the resulting via length may then result in the vias acting as secondary dipole antennas. In addition, such relatively long vias could introduce substantial parasitic inductance, thereby limiting the bandwidth. The high-band patch antenna element 300 is thus parasitically driven. But in other implementations (for example with less separation between the first low-band patch antenna element 200 and the high-band patch antenna element 300) the high-band patch antenna element 300 may be directly driven. The high-band patch antenna element 300 may have a diameter sized so as to be resonant at approximately 45 GHz.

Figure 4:
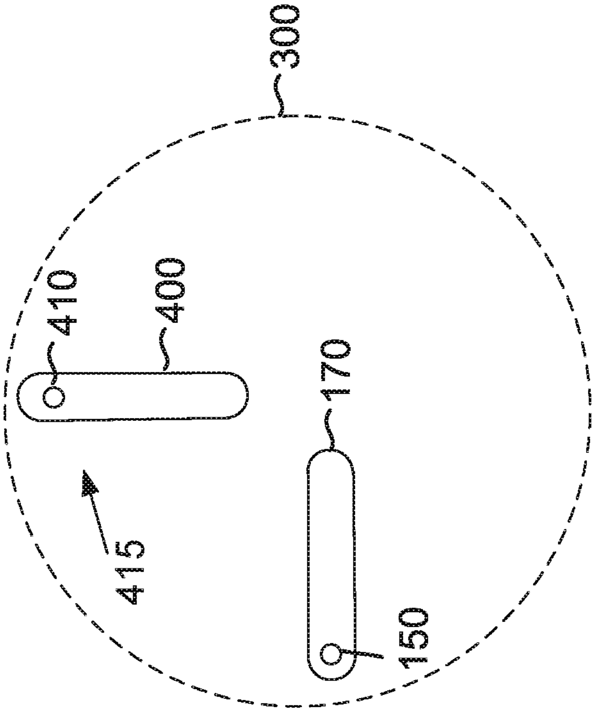
FIG. 4 is a plan view of a pair of L-shaped probes for a multi-band antenna element in accordance with an aspect of the disclosure.

To provide the parasitic drive to the high-band patch antenna element 300, the second metal layer 125 is patterned to form rectangular feeds 400 and 170 as shown in FIG. 4. The high-band patch antenna element 300 is shown in cut-away form in FIG. 4 to show the relationship of the rectangular feeds 400 and 170 to the high-band patch antenna element 300. Rectangular feeds 400 and 170 may be rounded rectangular feeds for improved performance. Akin to the alignment of vias 145 and 205 for the first low-band patch antenna element 200, the rectangular feeds 400 and 170 may have a similar orthogonal relationship with respect to the high-band patch antenna element 300 so that the feed 400 excites the high-band patch antenna element 300 according to the first linear polarization whereas the feed 170 excites the high-band patch antenna element 300 according to the second linear polarization. Each rectangular feed is driven by a corresponding via. In particular, a via 150 drives the feed 170 as also shown in FIG. 1. The combination of the via 150 and the feed 170 forms an inverted L shape in that the via 150 extends vertically whereas the feed 170 extends orthogonally from the via 150 since feed 170 is formed within the plane defined by the second metal layer 125. The combination of the feed 170 and the via 150 may thus be denoted as an L-shaped probe 180. Similarly, another L-shaped probe 415 is formed by the rectangular feed 400 and a corresponding via 410. Referring again to FIG. 2, openings or apertures in the first low-band patch antenna element 200 to allow vias 150 and 410 to pass through the first low-band patch antenna element 200 are not shown for illustration clarity.

Note the advantages of the L-shaped probes. As noted earlier, the alternative of driving the high-band patch antenna element 300 directly with vias may result in the vias acting as secondary dipole antennas due to their relatively long length as such vias would span from the ground plane formed by the first metal layer 115 to the third metal layer 130. In addition, such relatively long vias may have substantial parasitic inductance that then limits the bandwidth for the high band. Not only does the use of the L-shaped probes 180 and 415 avoid such lengthy vias, the parasitic capacitance of the rectangular feeds 400 and 170 may function to resonate out the parasitic inductance of the corresponding vias 150 and 410. Accordingly, the rectangular feeds 400 and 170 advantageously increase the high band bandwidth.

Figure 5:
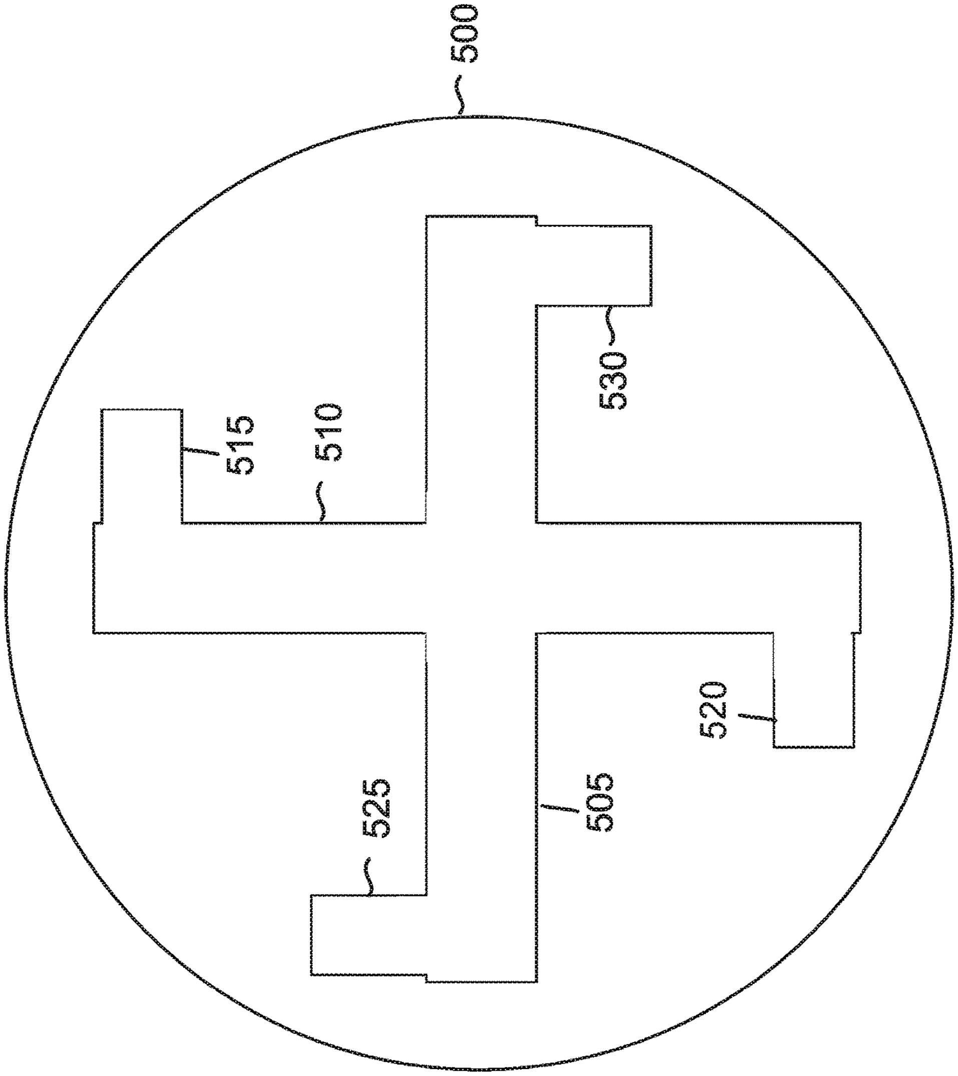
FIG. 5 is a plan view of a second low-band patch antenna element including slots with rectangular stubs for a multi-band antenna element in accordance with an aspect of the disclosure.

The fourth metal layer 135 may be patterned to form a second low-band patch antenna element 500 as shown in FIG. 5 to increase the low-band bandwidth as compared to a bandwidth observed when using only the first low-band patch antenna element 200. As discussed with respect to the other patch antennas, the second low-band patch antenna element 500 is a circular patch antenna element although it will be appreciated that other patch topologies such as a rectangular patch, a square patch or a plus-shaped patch antenna may be used in alternative implementations. To provide coverage across the low band, the first and second low-band patch antenna elements have corresponding diameters so that one of the patch antenna elements has a lower resonant frequency than the other. In the following discussion, it will be assumed that the second low-band patch antenna element 500 has the larger diameter such that the resonant frequency of the second low-band patch antenna element 500 is lower than the resonant frequency of the first low-band patch antenna element 200. However, it will be appreciated that in alternative implementations, it may be the first low-band patch antenna element 200 that has the lower resonant frequency. Whereas the first low-band patch antenna element 200 may be sized to be resonant at approximately 27.5 GHZ, the second low-band patch antenna element 500 may be sized to be resonant at approximately 25 GHz. The first low-band patch antenna element 200 parasitically drives the second low-band patch antenna element 500 for a combined operation across the low-band. The combination of the first low-band patch antenna element 200 and the second low-band patch antenna element 500 thus provides coverage from 24.25 GHz to 29.5 GHz to cover the entirety of the low band.

To increase the bandwidth of the potentially narrowband high-band patch antenna 300, the fourth metal layer 135 could be patterned to form smaller parasitic patches that surround the second low-band patch antenna element 500. In such an implementation, the second low-band patch antenna element 500 may be a rectangular patch antenna element. But the surrounding smaller parasitic patches would increase the overall size of the multi-band antenna element 100, which may be undesirable with respect to integrating the multi-band antenna element 100 into an array of antennas. To maintain a compact size for the multi-band antenna element 100, the second low-band patch antenna element 500 is thus configured with a horizontally-aligned linear slot 505 and a vertically-aligned linear slot 510 that together extend the bandwidth of the high band. More generally, the slot 505 has a longitudinal axis that is orthogonal to a longitudinal axis of the slot 510. Each slot 505 and 510 may be symmetric with respect to a center of the second low-band patch antenna 500.

Note that the resonant frequency of a slot antenna is a function of the longitudinal length of the slot. Since the high-band patch antenna element 300 may be sized so as to be resonant at 45 GHz, the slots 505 and 510 may be sized to extend the coverage at the lower end of the high band. For example, each slot 505 and 510 may have a length so as to be resonant at 39 GHz. The second low-band patch antenna element 500 thus also functions as a pair of high-band slot antenna elements. As compared to the fringing field of a patch antenna element, a slot antenna element has an "anti-fringing" electric field that is strongest at the center of the slot and weakest at the end of the slot. The interaction of the fringing field of the high-band patch antenna element 300 with the anti-fringing field of the slot antenna elements advantageously increases the bandwidth of the high band performance. The longitudinal axis of each slot 505 and 510 is orthogonal to the resulting polarization. For example, if the first polarization is a vertical polarization, it may be seen that the slot 505 will radiate vertically-polarized electromagnetic waves. In such an implementation, slot 510 is aligned for the radiation of horizontally-polarized electromagnetic waves.

Another factor limiting the performance at the upper edge of the high band is the parasitic capacitance of the second low-band patch antenna element 500. To tune away this parasitic capacitance, each slot 505 and 510 ends in an inductive stub (which may also be denoted as a sub-slot) that is orthogonally aligned to a longitudinal axis of the slot. For example, an upper end of the slot 510 couples to a rectangular stub 515 that has a longitudinal axis that is orthogonal to a longitudinal axis of the slot 510. Similarly, a lower end of the slot 510 couples to a rectangular stub 520 that has a longitudinal axis that is orthogonal to the longitudinal axis of the slot 510. The stubs 515 and 520 are antisymmetric such that the stub 515 extends to the right of the slot 510 whereas the stub 520 extends to the left of the slot 510. Similarly, a left end of the slot 505 couples to a rectangular stub 525 that has a longitudinal axis that is orthogonal to the longitudinal axis of the slot 505. Finally, a right end of the slot 505 couples to a rectangular stub 530 that has a longitudinal axis that is orthogonal to the longitudinal axis of the slot 505. The stubs 525 and 530 are aligned in an antisymmetric fashion such that the stub 525 extends upwards whereas the stub 530 extends downwards. The inductive load from the stubs 515 through 530 lowers the bandwidth-limiting effect from the parasitic capacitance of the second low-band patch antenna element 500. In addition, the stubs extend the dimensions of their respective slots to accommodate the lower band edge of the high band (extending performance to 37 GHz). In other examples, there are two stubs, extending in opposite directions, from the end of each of the slots 505 and 510 (e.g., in "T" configuration at each end, or an "I" configuration when viewed as a whole).

Figure 6:
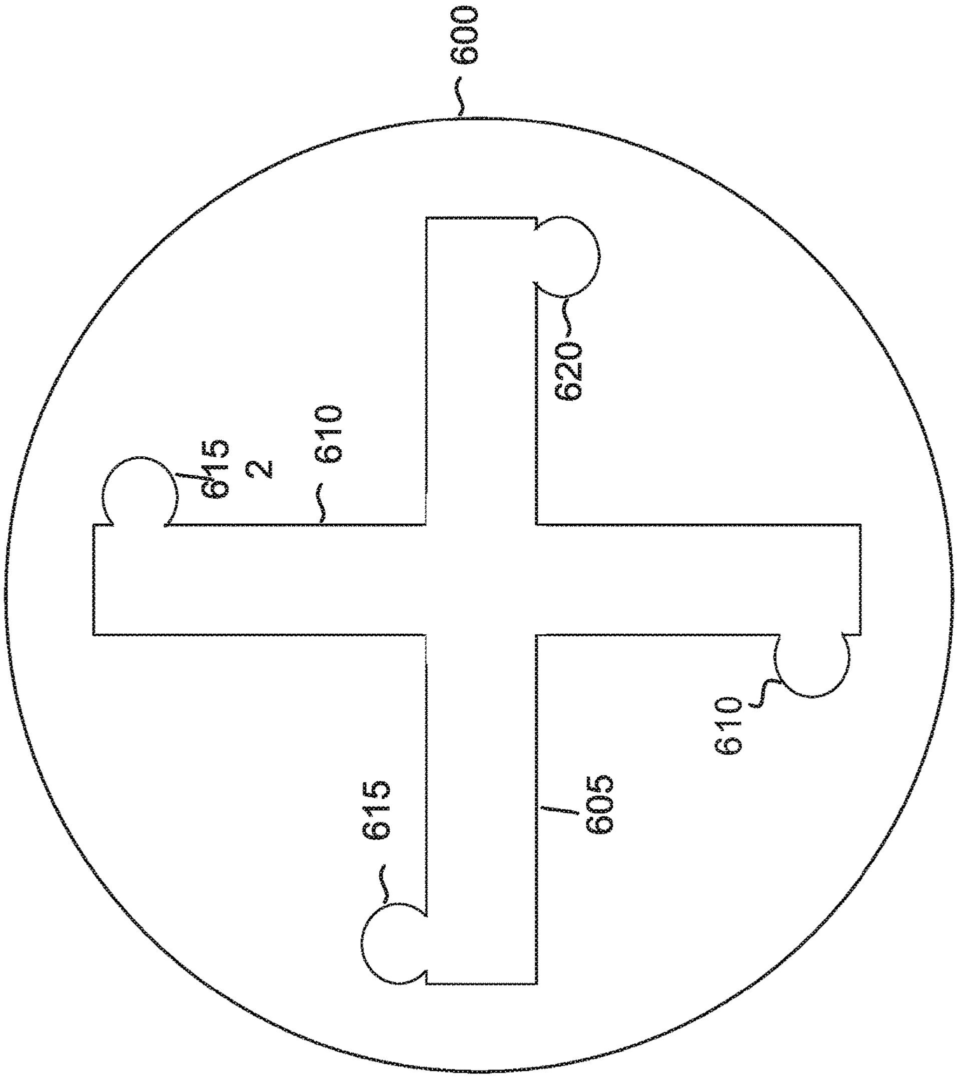
FIG. 6 is a plan view of a second low-band patch antenna element including slots with circular stubs for a multi-band antenna element in accordance with an aspect of the disclosure.

It will be appreciated that the stubs need not be rectangular because alternative stub implementations may be shaped to orthogonally extend from the slot ends in an antisymmetric fashion. For example, an alternative second low-band patch antenna element 600 is shown in FIG. 6. Referring again to FIG. 1, the second low-band patch antenna element 600 may be patterned from the fourth metal layer 135. The second low-band patch antenna element 600 includes a pair of orthogonally-aligned slots 605 and 610 in an analogous fashion to the arrangement of linear slots 505 and 510 in the second low-band patch antenna element 500. An upper end of the slot 610 couples to a circular stub 615 that extends orthogonally with respect to a longitudinal axis of the slot 610. Similarly, a lower end of the slot 610 couples to a circular stub 620 that extends orthogonally with respect to the longitudinal axis of the slot 510. The stubs 615 and 620 are antisymmetric such that the stub 615 extends to the right of the slot 610 whereas the stub 620 extends to the left of the slot 610. Similarly, a left end of the slot 605 couples to a circular stub 625 that extends orthogonally to the longitudinal axis of the slot 605. Finally, a right end of the slot 605 couples to a circular stub 630 that extends orthogonally to the longitudinal axis of the slot 605. The stubs 625 and 630 are aligned in an antisymmetric fashion such that the stub 625 extends upwardly from the longitudinal axis of the slot 605 whereas the stub 630 extends downwardly. The inductive load from the stubs 615 through 630 lowers the bandwidth-limiting effect from the parasitic capacitance of the second low-band patch element 600. In addition, the stubs extend the dimensions of their respective slots to accommodate the lower band edge of the high band (extending performance to 37 GHz). As in the example of FIG. 5, two stubs may extend in opposite directions from the end of each of the slots 605 and 610.

To achieve the desired resonant frequencies, the various patches, slots, and stubs are sized accordingly. In one implementation, the first low-band patch antenna element 200 may thus have a diameter of 3.2 mm. Similarly, the first low-band patch antenna element 300 may have a diameter of 1.9 mm. In addition, the second low-band patch antenna element 500 may have a diameter of 3.3 mm. The slots 505 and 510 may have a length of 2.7 mm and a width of 0.4 mm. Each rectangular stub may have a length of 0.45 mm and a width of 0.35 mm. Note, however, that the resonant frequencies produced by these features depend upon a number of factors such as the dielectric constant for the insulating layers in the multi-band antenna element 100. It will thus be appreciated that these dimensions are merely illustrative.

Referring again to FIGS. 1 and 2, the fourth metal layer 135 may be adjacent to free space 160 (air). Finally, a non-conducting protective film (or radome) 165 seals the multi-band antenna element 100.

Figure 7:
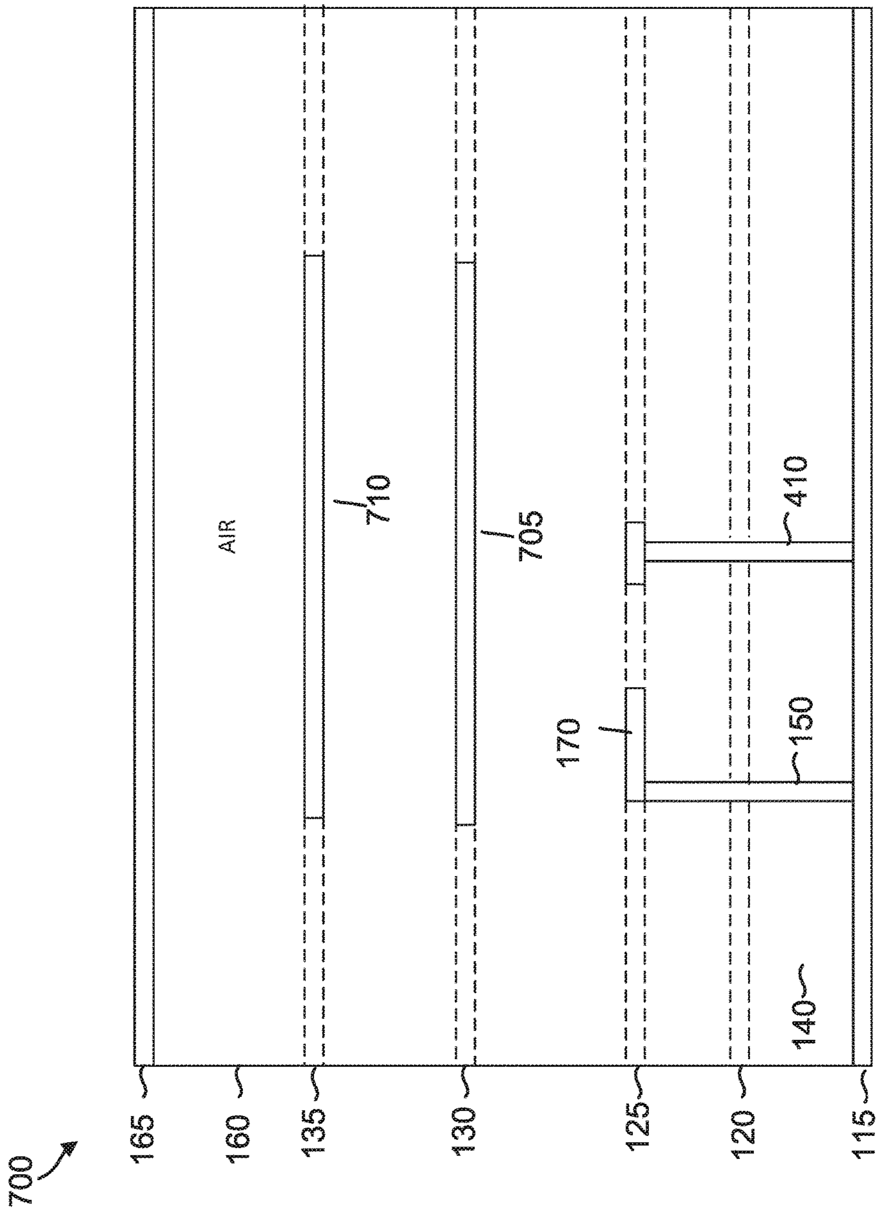
FIG. 7 is a cross-sectional view of a high-band antenna element in accordance with an aspect of the disclosure.

A linear antenna array will now be discussed in which a plurality of multi-band antenna elements as disclosed herein is interleaved with a plurality of high-band antenna elements. Each multi-band antenna element in the array may be implemented as discussed for multi-band antenna 100. An example high-band antenna element 700 is shown in FIG. 7. For construction simplicity, the high-band antenna element

700 is implemented using the same layers as discussed for the multi-band antenna element 100 and thus includes metal layers 115 through 135, air layer 160, and protective film 165. However, since no low-band structure is needed, the first metal layer 120 is patterned away. A first circular high-band patch antenna element 705 (FIG. 3) is formed from the third metal layer 130 as discussed analogously for the high-band patch antenna element 300. The rectangular feeds 400 and 170 (FIG. 4) are formed from the second metal layer 125 and fed by vias 150 and 410 as discussed previously. A second circular high-band patch antenna element 710 is formed from the fourth metal layer 135 in an analogous fashion to the formation of first high-band patch antenna element 705. The stacking of the first and second high-band patch antennas 705 and 710 combined with the parasitic-inductance-cancelling coupled feed from the L-shaped probes allows the high-band antenna element 700 to service the entirety of the high band (e.g., from 37 GHz to 48 GHZ). Due to arrangement of the pair of L-shaped probes, the high-band antenna element 700 offers dual-polarized coverage across the high band.

Figure 8:
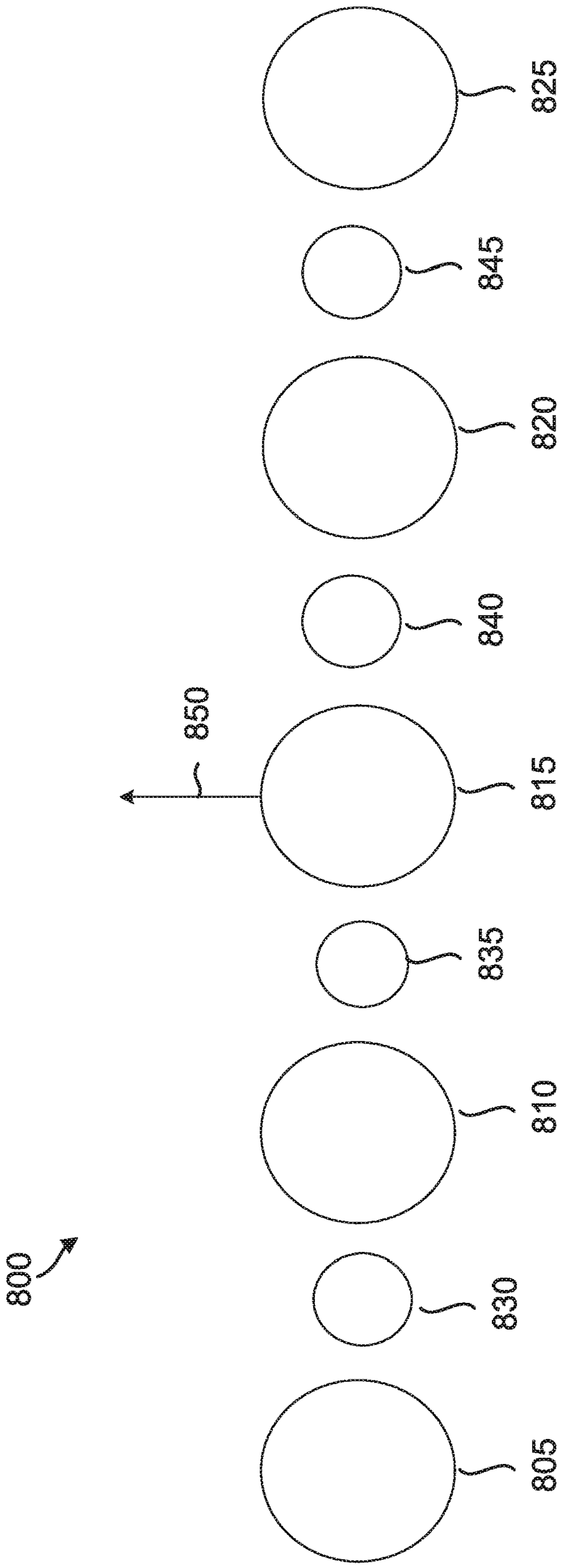
FIG. 8 is a plan view of a linear antenna array including interleaved multi-band and high-band antenna elements in accordance with an aspect of the disclosure.

The use of circular patch antennas in both the multi-band antenna elements and the high-band antenna elements leads to an advantageously-compact linear array 800 as shown in FIG. 8. The example linear array 800 is formed by an interleaving or alternation of multi-band and high-band antenna elements. In this example implementation, there is an odd number of multi-band antenna elements although it will be appreciated that an even number of multi-band antenna elements may be used in alternative implementations. In array 800, there are five multi-band antenna elements ranging from a first multi-band antenna element 805 to a fifth multi-band antenna element 825. The use of an odd number of multi-band antenna elements is advantageous with respect to the mutual coupling to a third (or center) multi-band antenna element 815. To the left of the center multi-band antenna element 815 are two multi-band antenna elements (the first multi-band antenna element 805 and a second multi-band element 810) interleaved with two high-band antenna elements 830 and 835. The high-band antenna element 830 intervenes between the first and second multi-band antenna elements 805 and 810 whereas the high-band antenna element 835 intervenes between the second and third multi-band antenna elements 810 and 815.

There is thus an alternating series of two multi-band antenna elements and two high-band antenna elements to the left of the third multi-band antenna element 815. An analogous alternating series sits to the right of the third multi-band antenna element 815 as formed by a high-band antenna element 840, a fourth multi-band antenna element 820, a high-band antenna element 845, and the fifth multi-band antenna element 825. It may thus be seen that the mutual coupling between the center multi-band antenna element 815 and the antenna elements to its left is advantageously symmetric with the mutual coupling between the center multi-band antenna element 815 and the antenna elements to its right. Each high-band antenna element in the array 800 may be implemented as discussed for the high-band antenna 700. Similarly, each multi-band antenna element in the array 800 may be implemented as discussed for the multi-band antenna element 100.

A spacing between adjacent antennas in the array 800 will now be discussed. Note that the spacing (which may be represented by a variable d) affects the desired directivity of the array 800 in a broadside direction 850. The broadside direction 850 is normal to a plane defined by the array 800. In that regard, it can be shown that a maximum scan angle θ from the broadside direction 850 is function of a ratio (d/λ) of the spacing d and the band wavelength λ as defined by the following Equation (1):

$$d/\lambda \le (1/(1+|\cos(\theta|)) \qquad \text{Eq. (1)}$$

For example, suppose that the maximum scan angle θ is 45 degrees. It follows from Equation (1) that the ratio d/λ would then be less than or equal to approximately 0.585. For such a maximum scan angle, the spacing d between adjacent antenna elements in array 800 may be approximately 3 mm. The corresponding spacing between successive multi-band antenna elements in array 800 would then be approximately 6 mm for a maximum scan angle of 45 degrees. Assuming that both the high-band and the multi-band antenna elements have the same number of input ports (which would be two each for the multi-band antenna element 100 and the high-band antenna element 700), the ports to the high-band antenna elements 830 and 845 may be terminated in some implementations. Although array 800 is a linear array, it will be appreciated that it may be scaled to instead form a planar (two-dimensional) array in alternative implementations. Note that array 800 advantageously provides relatively optimum array factors in both the low band and in the high band. Moreover, the resulting directivity for the high band may help to mitigate the higher propagations losses for the high band. In addition, the use of array 800 enables the aggregation of carriers of any desired bandwidth across the low and high bands. With respect to the FR2 low band and high band defined herein in which the lowest frequency of the high band is approximately 1.25 times larger than the highest frequency of the low band, array 800 advantageously provides wideband coverage across both the low band and the high band with optimized radiation patterns.

Figure 9:
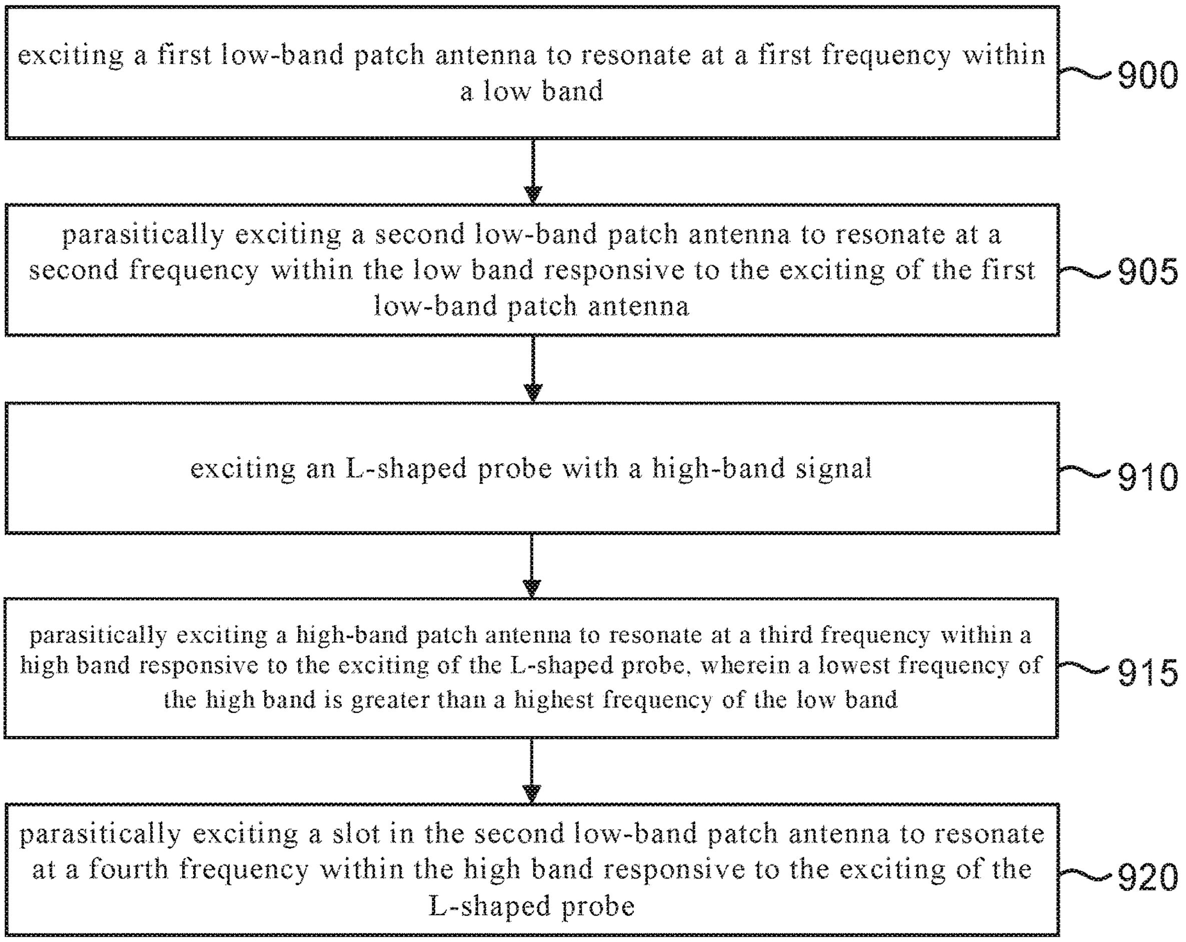
FIG. 9 is a flowchart for a multi-band antenna element method of operation in accordance with an aspect of the disclosure.

An example multi-band antenna method of operation will now be discussed with reference to the flowchart of FIG. 9. The method includes an act 900 of exciting a first low-band patch antenna to resonate at a first frequency within a low band. The exciting of the first low-band patch antenna element 200 through either of the vias 145 and 205 (each via coupling to a corresponding port) is an example of act 900. The method also includes an act 905 of parasitically exciting a second low-band patch antenna to resonate at a second frequency within the low band responsive to the exciting of the first low-band patch antenna. The parasitic exciting of the second low-band patch antenna element 500 in response to the exciting of the first low-band patch antenna element 200 is an example of act 905. In addition, the method also includes an act 910 of exciting an L-shaped probe with a high-band signal. The exciting of the L-shaped probe 180 or the L-shaped probe 415 is an example of act 910. Moreover, the method includes an act 915 of parasitically exciting a high-band patch antenna to resonate at a third frequency within a high band responsive to the exciting of the L-shaped probe, wherein a lowest frequency of the high band is greater than a highest frequency of the low band. The exciting of the high-band patch antenna element 300 is an example of act 915. Finally, the method includes an act 920 of parasitically exciting a slot in the second low-band patch antenna to resonate at a fourth frequency within the high band responsive to the exciting of L-shaped probe. The excitation of slot 505 responsive to the excitation of the L-shaped probe 415 is an example of act 920. Similarly, the excitation of slot 510 responsive to the excitation of the L-shaped probe 180 is an example of act 920.

The disclosure will now be summarized in the following example clauses.

Clause 1. A multi-band antenna element, comprising;

a ground plane;

a first patch antenna element adjacent the ground plane;

a first L-shaped probe including a first via and a first feed, wherein the first via extends from the ground plane to the first feed, the first patch antenna element is positioned between the first feed and the ground plane, and a plane defined by the first feed is orthogonal to the first via;

a second patch antenna element, wherein the first feed is positioned between the second patch antenna element and the first patch antenna element, and wherein the first L-shaped probe is configured to parasitically excite the second patch antenna element; and a third patch antenna element including a first linear slot, wherein the second patch antenna element is positioned between the third patch antenna element and the first feed, the first patch antenna element is configured to parasitically excite the third patch antenna element, and the second patch antenna element is configured to parasitically excite the first linear slot.

Clause 2. The multi-band antenna element of clause 1, wherein the first patch antenna element is a first circular patch antenna element having a first diameter, the second patch antenna element is a second circular patch antenna element having a second diameter that is less than the first diameter, and the third patch antenna element is a third circular patch antenna element having a third diameter that is greater than the second diameter.

Clause 3. The multi-band antenna element of clause 2, wherein the first diameter is sized so that the first patch antenna element is resonant at a first frequency within a low band and the third diameter is sized so that the third patch antenna element is resonant at a second frequency within the low band.

Clause 4. The multi-band antenna element of clause 3, wherein the second frequency within the low band is lower than the first frequency within the low band.

Clause 5. The multi-band antenna element of clause 3, wherein the second diameter of the second patch antenna element is sized so that the second patch antenna element is resonant within a first frequency of a high band that includes a lowest frequency that is higher than a highest frequency of the low band.

Clause 6. The multi-band antenna element of clause 5, wherein a length of the first linear slot is sized so that the first linear slot is resonant at a second frequency within the high band.

Clause 7. The multi-band antenna element of clause 6, wherein the low band is a low band of FR2 and the high band is a high band of FR2.

Clause 8. The multi-band antenna element of clause 6, wherein the first frequency of the low band is approximately 27.5 GHz and the second frequency of the low band is approximately 25 GHz.

Clause 9. The multi-band antenna element of clause 6, wherein the first frequency of the high band is approximately 45 GHz and the second frequency of the high band is approximately 39 GHz.

Clause 10. The multi-band antenna element of any of clauses 1-8, further comprising:

a second L-shaped probe including a second via and a second feed, wherein the second via extends from the ground plane to the second feed, and the second feed lies within the plane defined by the first feed.

Clause 11. The multi-band antenna element of clause 10, wherein the first L-shaped probe is positioned to parasitically excite the second patch antenna element according to a first linear polarization, and the second L-shaped probe is positioned to parasitically excite the second patch antenna element according to a second linear polarization.

Clause 12. The multi-band antenna element of clause 6, wherein the third patch antenna element further includes a second linear slot positioned to intersect the first linear slot at a center of the third patch antenna element, and wherein the second linear slot is also sized to be resonant at the second frequency within the high band.

Clause 13. The multi-band antenna element of clause 12, wherein the second linear slot is aligned to intersect the first linear slot according to a right angle, and the third patch antenna element further includes:

a first stub orthogonally extending from a first end of the first linear slot;

a second stub orthogonally extending from a second end of the first linear slot;

a third stub orthogonally extending from a first end of the second linear slot; and a fourth stub orthogonally extending from a second end of the second linear slot.

Clause 14. The multi-band antenna element of clause 13, wherein the first stub is antisymmetric with respect to the second stub, and the third stub is antisymmetric with respect to the fourth stub.

Clause 15. The multi-band antenna element of any of clauses 1-14, further comprising;

a second via extending from the ground plane to the first patch antenna element; and a third via extending from the ground plane to the first patch antenna element.

Clause 16. The multi-band antenna element of clause 15, wherein the second via is positioned to excite the first patch antenna element according to a first linear polarization, and the third via is positioned to excite the first patch antenna element according to a second linear polarization.

Clause 17. The multi-band antenna element of clause 16, wherein the first linear polarization is orthogonal to the second linear polarization.

Clause 18. The multi-band antenna element of any of clauses 1-16, wherein the ground plane is adjacent free space.

Clause 19. The multi-band antenna element of any of clauses 1-18, further comprising:

an air layer covering the third patch antenna element; and a non-conducting protective film covering the air layer.

Clause 20. A multi-band antenna method of operation, comprising:

exciting a first low-band patch antenna to resonate at a first frequency within a low band;

parasitically exciting a second low-band patch antenna to resonate at a second frequency within the low band responsive to the exciting of the first low-band patch antenna;

exciting an L-shaped probe with a high-band signal;

parasitically exciting a high-band patch antenna to resonate at a third frequency within a high band responsive to the exciting of the L-shaped probe, wherein a lowest frequency of the high band is greater than a highest frequency of the low band; and parasitically exciting a slot in the second low-band patch antenna to resonate at a fourth frequency within the high band responsive to the exciting of the L-shaped probe.

Clause 21. The multi-band antenna method of operation of clause 20, wherein the first frequency within the low band is greater than the second frequency within the low band.

Clause 22. The multi-band antenna method of operation of clause 20, wherein the third frequency within the high band is greater than the fourth frequency within the high band.

Clause 23. A linear antenna array, comprising:

a plurality of multi-band antenna elements, wherein each multi-band antenna element is configured to transmit and receive across a low band and across a high band, wherein a lowest frequency of the high band is greater than a highest frequency of the low band;

and a plurality of high-band antenna elements, wherein each high-band antenna element is configured to transmit and receive across the high band, the high-band antenna elements and the multi-band antenna elements alternate in order with respect to each other across the linear antenna array, and a spacing between each high-band antenna element to a neighboring one of the multi-band antenna elements is sized according to a maximum scan angle that is less than or equal to 90 degrees, and wherein the scan angle is defined with respect to a normal to a plane of the linear antenna array.

Clause 24. The linear antenna array of clause 23, wherein the maximum scan angle is approximately 45 degrees and a minimum scan angle is approximately-45 degrees.

Clause 25. The linear antenna array of clause 23, wherein each multi-band antenna element comprises:

a first patch antenna element configured to be resonant at a first frequency of the low band;

a second patch antenna element configured to be resonant at a first frequency of the high band; and a third patch antenna element configured to be resonant at a second frequency in the low band, wherein the first frequency of the low band is greater than the second frequency of the low band.

Clause 26. The linear antenna array of clause 25, wherein each multi-band antenna element further comprises:

an L-shaped probe configured to parasitically excite the second patch antenna.

Clause 27. The linear antenna array of clause 25, wherein the third patch antenna includes a linear slot configured to be resonant at a second frequency of the high band, wherein the first frequency of the high band is greater than the second frequency of the high band.

In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A multi-band antenna element, comprising;

a ground plane;

a first patch antenna element adjacent the ground plane;

a first L-shaped probe including a first via and a first feed, wherein the first via extends from the ground plane to the first feed, the first patch antenna element is positioned between the first feed and the ground plane, and a plane defined by the first feed is orthogonal to the first via;

a second patch antenna element, wherein the first feed is positioned between the second patch antenna element and the first patch antenna element, and wherein the first L-shaped probe is configured to parasitically excite the second patch antenna element; and a third patch antenna element including a first linear slot, wherein the second patch antenna element is positioned between the third patch antenna element and the first feed, the first patch antenna element is configured to parasitically excite the third patch antenna element, and the second patch antenna element is configured to parasitically excite the first linear slot.

2. The multi-band antenna element of claim 1, wherein the first patch antenna element is a first circular patch antenna element having a first diameter, the second patch antenna element is a second circular patch antenna element having a second diameter that is less than the first diameter, and the third patch antenna element is a third circular patch antenna element having a third diameter that is greater than the second diameter.

3. The multi-band antenna element of claim 2, wherein the first diameter is sized so that the first patch antenna element is resonant at a first frequency within a low band, the third diameter is sized so that the third patch antenna element is resonant at a second frequency within the low band.

4. The multi-band antenna element of claim 3, wherein the second frequency within the low band is lower than the first frequency within the low band.

5. The multi-band antenna element of claim 3, wherein the second diameter of the second patch antenna element is sized so that the second patch antenna element is resonant within a first frequency of a high band that includes a lowest frequency that is higher than a highest frequency of the low band.

6. The multi-band antenna element of claim 5, wherein a length of the first linear slot is sized so that the first linear slot is resonant at a second frequency within the high band.

7. The multi-band antenna element of claim 6, wherein the low band is a low band of FR2 and the high band is a high band of FR2.

8. The multi-band antenna element of claim 6, wherein the first frequency of the low band is approximately 27.5 GHz and the second frequency of the low band is approximately 25 GHz.

9. The multi-band antenna element of claim 6, wherein the first frequency of the high band is approximately 45 GHz and the second frequency of the high band is approximately 39 GHz.

10. The multi-band antenna element of claim 1, further comprising:

a second L-shaped probe including a second via and a second feed, wherein the second via extends from the ground plane to the second feed, and the second feed lies within the plane defined by the first feed.

11. The multi-band antenna element of claim 10, wherein the first L-shaped probe is positioned to parasitically excite the second patch antenna element according to a first linear polarization, and the second L-shaped probe is positioned to parasitically excite the second patch antenna element according to a second linear polarization.

12. The multi-band antenna element of claim 6, wherein the third patch antenna element further includes a second linear slot positioned to intersect the first linear slot at a center of the third patch antenna element, and wherein the second linear slot is also sized to be resonant at the second frequency within the high band.

13. The multi-band antenna element of claim 12, wherein the second linear slot is aligned to intersect the first linear slot according to a right angle, and the third patch antenna element further includes:

a first stub orthogonally extending from a first end of the first linear slot;

a second stub orthogonally extending from a second end of the first linear slot;

a third stub orthogonally extending from a first end of the second linear slot; and a fourth stub orthogonally extending from a second end of the second linear slot.

14. The multi-band antenna element of claim 13, wherein the first stub is antisymmetric with respect to the second stub, and the third stub is antisymmetric with respect to the fourth stub.

15. The multi-band antenna element of claim 1, further comprising;

a second via extending from the ground plane to the first patch antenna element; and a third via extending from the ground plane to the first patch antenna element.

16. The multi-band antenna element of claim 15, wherein the second via is positioned to excite the first patch antenna element according to a first linear polarization, and the third via is positioned to excite the first patch antenna element according to a second linear polarization.

17. The multi-band antenna element of claim 16, wherein the first linear polarization is orthogonal to the second linear polarization.

18. The multi-band antenna element of claim 1, wherein the ground plane is adjacent free space.

19. The multi-band antenna element of claim 1, further comprising:

an air layer covering the third patch antenna element; and a non-conducting protective film covering the air layer.

20. A multi-band antenna method of operation, comprising:

exciting a first low-band patch antenna to resonate at a first frequency within a low band;

parasitically exciting a second low-band patch antenna to resonate at a second frequency within the low band responsive to the exciting of the first low-band patch antenna;

exciting an L-shaped probe with a high-band signal;

parasitically exciting a high-band patch antenna to resonate at a third frequency within a high band responsive to the exciting of the L-shaped probe, wherein a lowest frequency of the high band is greater than a highest frequency of the low band; and parasitically exciting a slot in the second low-band patch antenna to resonate at a fourth frequency within the high band responsive to the exciting of the L-shaped probe.

21. The multi-band antenna method of operation of claim 20, wherein the first frequency within the low band is greater than the second frequency within the low band.

22. The multi-band antenna method of operation of claim 20, wherein the third frequency within the high band is greater than the fourth frequency within the high band.

23. A linear antenna array, comprising:

a plurality of multi-band antenna elements, wherein each multi-band antenna element is configured to transmit and receive across a low band and across a high band, wherein a lowest frequency of the high band is greater than a highest frequency of the low band;

and a plurality of high-band antenna elements, wherein each high-band antenna element is configured to transmit and receive across the high band, the high-band antenna elements and the multi-band antenna elements alternate in order with respect to each other across the linear antenna array, and a spacing between each high-band antenna element to a neighboring one of the multi-band antenna elements is sized according to a maximum scan angle that is less than 90 degrees, and wherein the scan angle is defined with respect to a normal to a plane of the linear antenna array.

24. The linear antenna array of claim 23, wherein the maximum scan angle is approximately 45 degrees and a minimum scan angle is approximately-45 degrees.

25. The linear antenna array of claim 23, wherein each multi-band antenna element comprises:

a first patch antenna element configured to be resonant at a first frequency of the low band;

a second patch antenna element configured to be resonant at a first frequency of the high band; and a third patch antenna element configured to be resonant at a second frequency in the low band, wherein the first frequency of the low band is greater than the second frequency of the low band.

26. The linear antenna array of claim 25, wherein each multi-band antenna element further comprises:

an L-shaped probe configured to parasitically excite the second patch antenna element.

27. The linear antenna array of claim 25, wherein the third patch antenna element includes a linear slot configured to be resonant at a second frequency of the high band, wherein the first frequency of the high band is greater than the second frequency of the high band.

* * * * *